United States Patent
Coutu et al.

(10) Patent No.: US 12,479,055 B2
(45) Date of Patent: Nov. 25, 2025

(54) METHOD OF MANUFACTURING A TURBINE SHROUD SEGMENT

(71) Applicant: PRATT & WHITNEY CANADA CORP., Longueuil (CA)

(72) Inventors: Marianne Coutu, Saint-Hubert (CA); Marc Campomanes, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 25 days.

(21) Appl. No.: 18/541,518

(22) Filed: Dec. 15, 2023

(65) Prior Publication Data

US 2025/0196274 A1    Jun. 19, 2025

(51) Int. Cl.
*B23P 15/00*    (2006.01)
*F01D 25/12*    (2006.01)

(52) U.S. Cl.
CPC .............. *B23P 15/00* (2013.01); *F01D 25/12* (2013.01); *B23P 2700/06* (2013.01); *F05D 2230/10* (2013.01); *F05D 2230/22* (2013.01)

(58) Field of Classification Search
CPC ...... B23P 15/00; B23P 2700/06; F01D 25/12; F05D 2230/10; F05D 2230/22
See application file for complete search history.

(56) References Cited

U.S. PATENT DOCUMENTS

| | | |
|---|---|---|
| 9,970,318 B2 | 5/2018 | Scalzo et al. |
| 10,011,044 B2 | 7/2018 | Campomanes et al. |
| 11,035,249 B2 | 6/2021 | Campomanes et al. |
| 11,097,343 B2 | 8/2021 | Scalzo et al. |
| 2018/0272562 A1 | 9/2018 | Campomanes et al. |
| 2022/0106887 A1* | 4/2022 | Biernat ............... F02C 7/12 |
| 2023/0140657 A1 | 5/2023 | Fuesting et al. |

FOREIGN PATENT DOCUMENTS

| | | |
|---|---|---|
| EP | 2985098 A2 | 2/2016 |
| EP | 3981955 A1 | 4/2022 |

OTHER PUBLICATIONS

Experimental Study of Conventional and Peck Drilling Operations. (Year: 2012).*
European Search report issued in counterpart EP application No. 24220358.6 on May 26, 2025.

\* cited by examiner

*Primary Examiner* — Moshe Wilensky
(74) *Attorney, Agent, or Firm* — NORTON ROSE FULBRIGHT CANADA LLP

(57) ABSTRACT

Methods of manufacturing a turbine shroud segment for a gas turbine engine are disclosed. One method involves receiving a turbine shroud segment green part, machining an axial cooling flow passageway in the turbine shroud segment green part, and after the machining of the axial cooling flow passageway, debinding and sintering the machined turbine shroud segment green part. Another method involves receiving a turbine shroud segment green part, machining a textured surface on the radially outer surface of the body to obtain a machined turbine shroud segment green part, and after the machining of the textured surface, debinding and sintering the machined turbine shroud segment green part. Another method involves injecting powder injection molding material into a mold having cavities defining negatives of features forming a textured surface on the radially outer surface of the body, and debinding and sintering the molded turbine shroud segment green part.

18 Claims, 14 Drawing Sheets

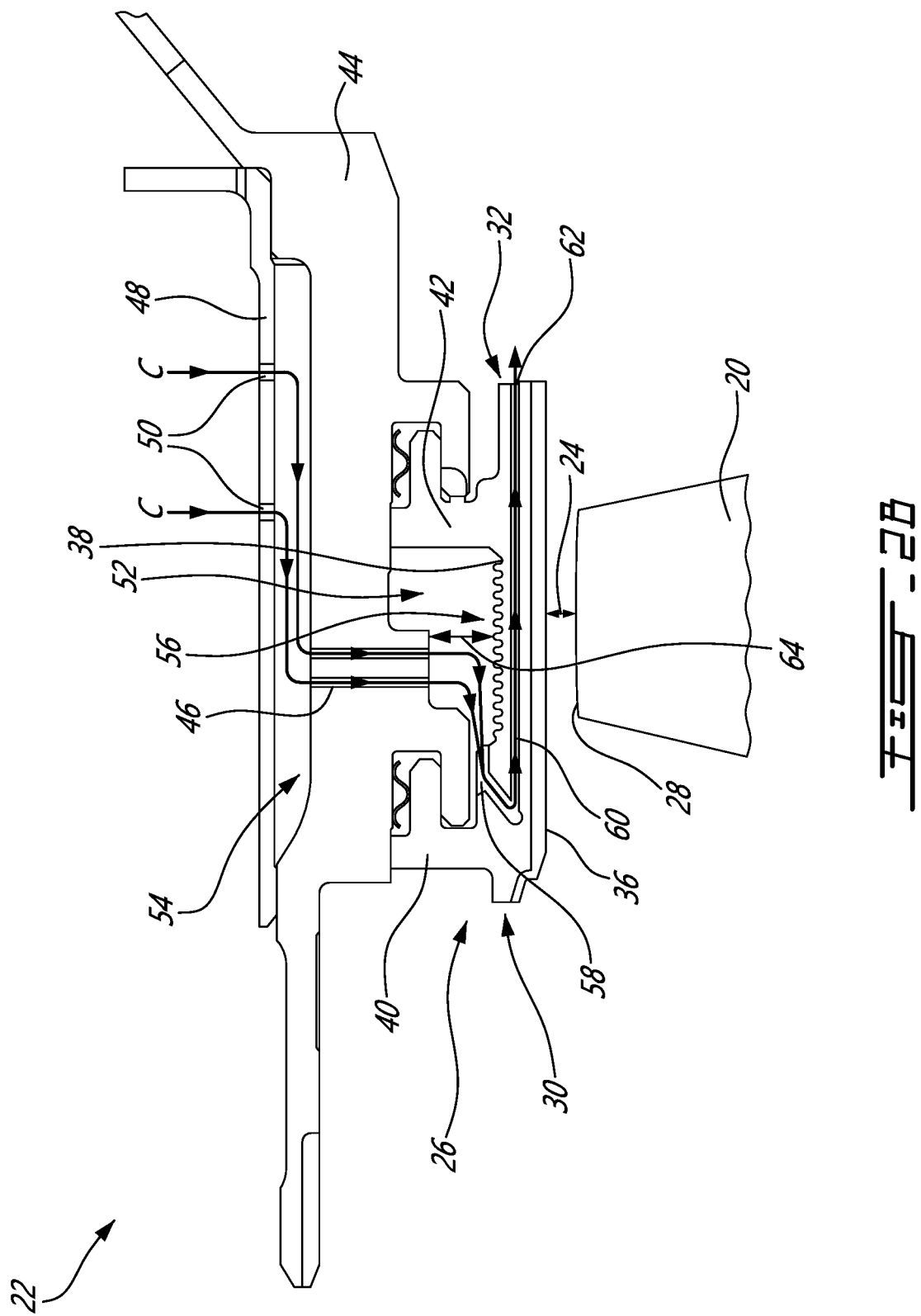

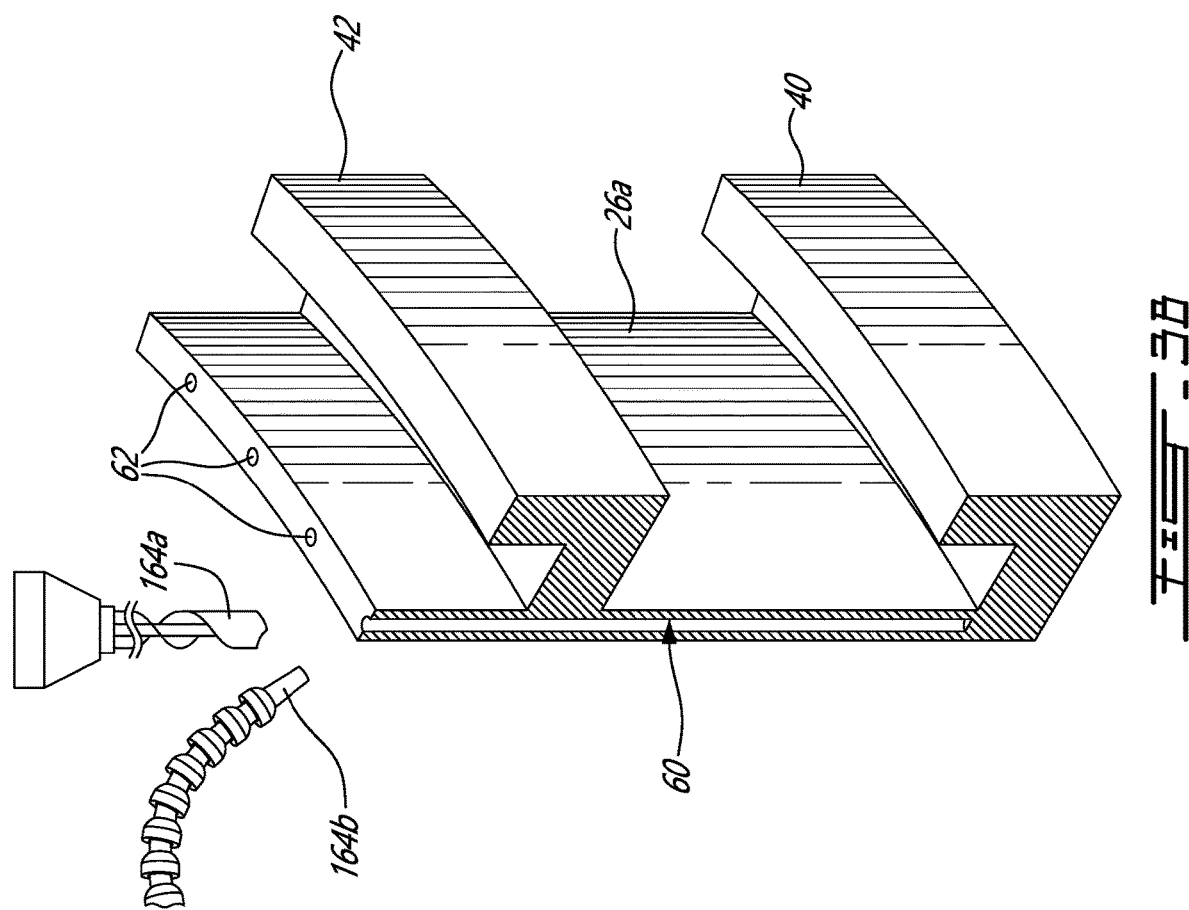

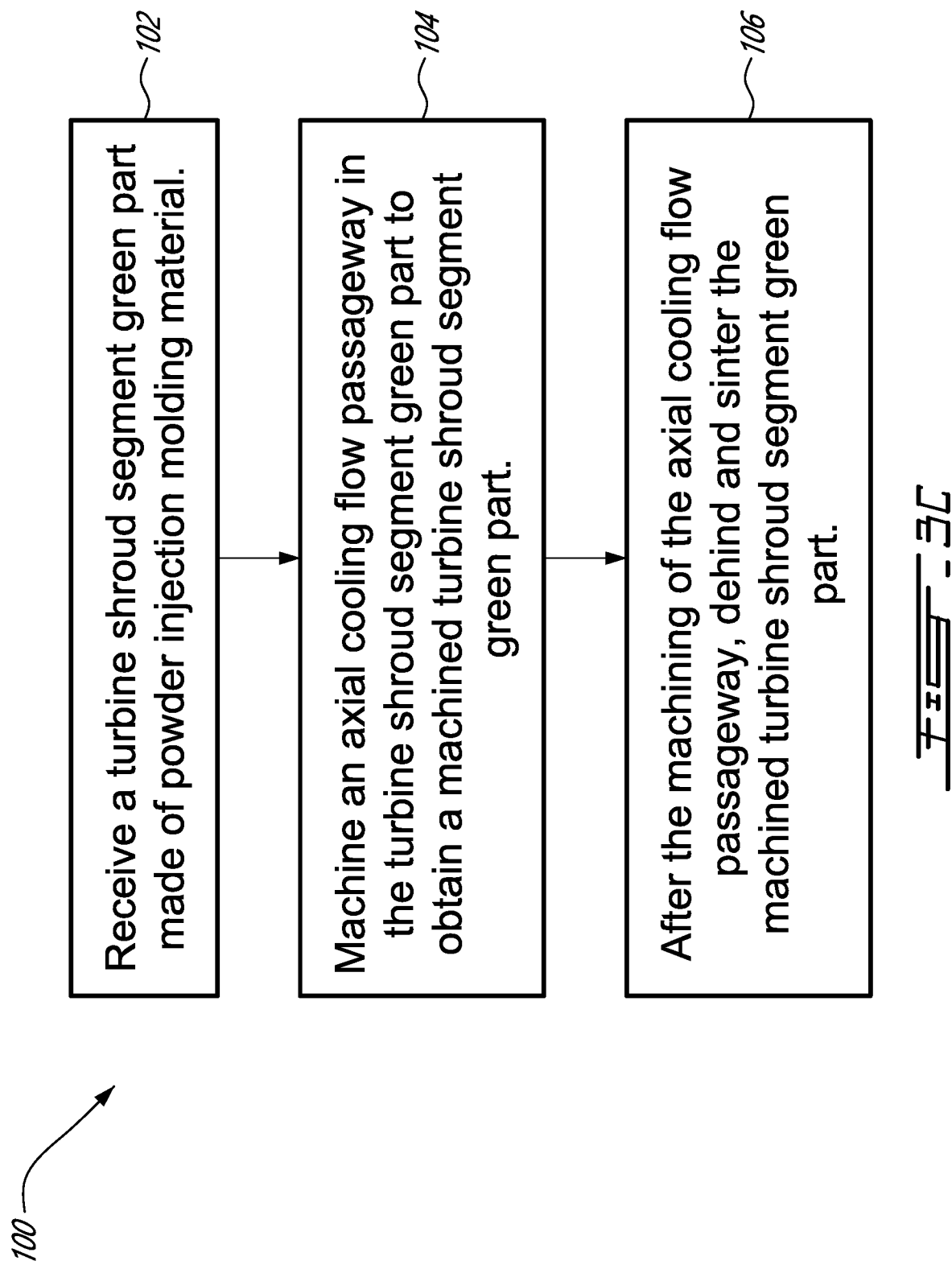

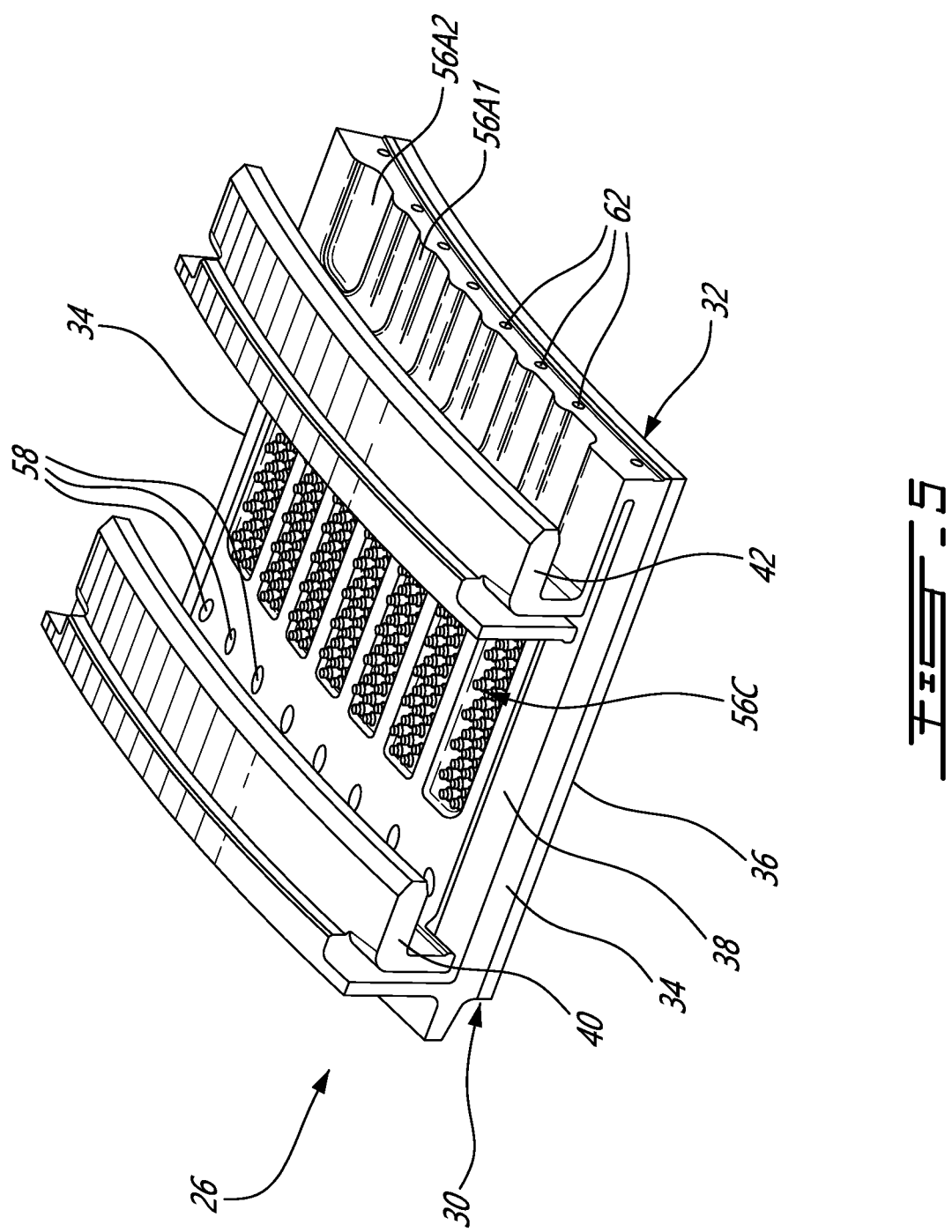

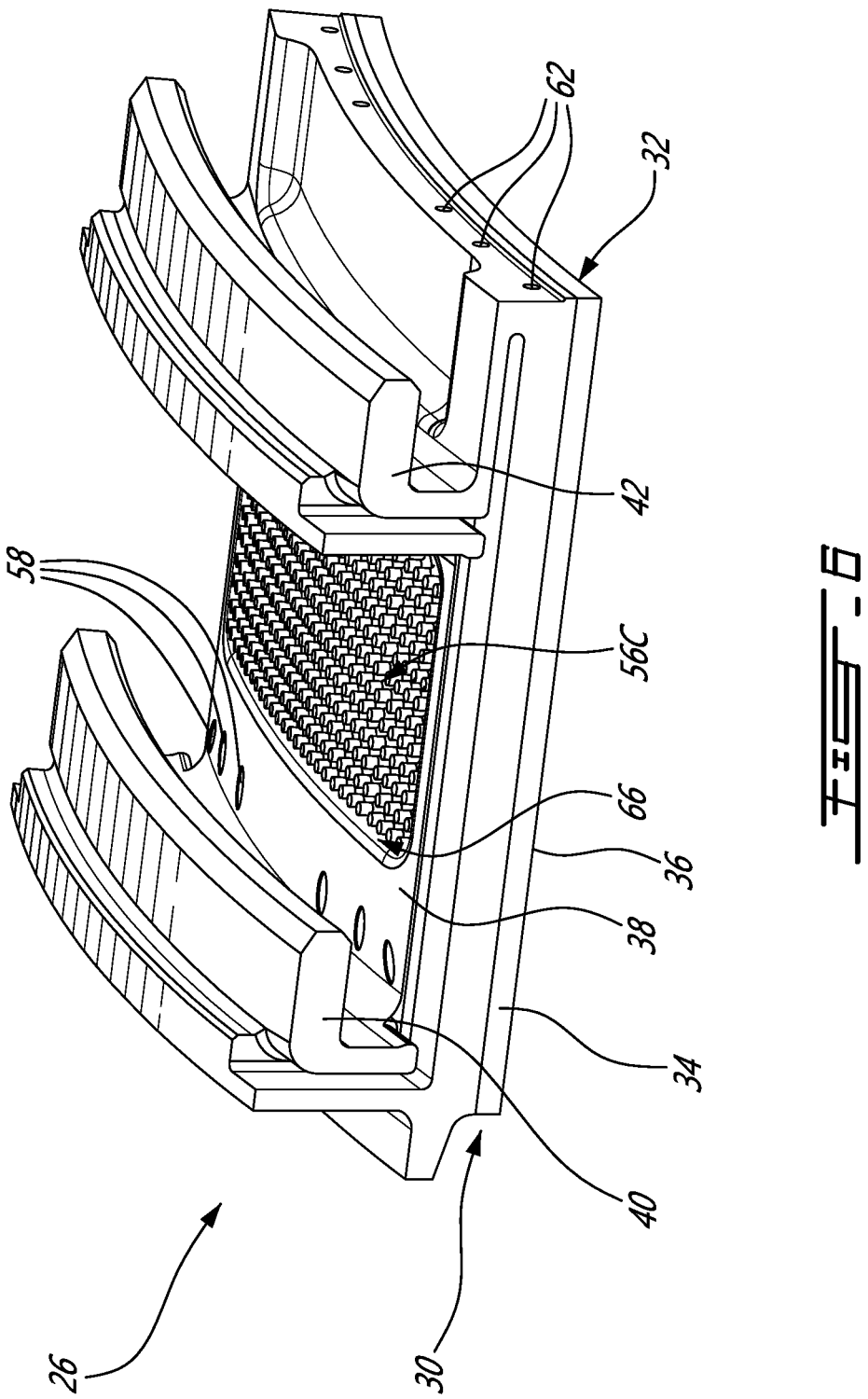

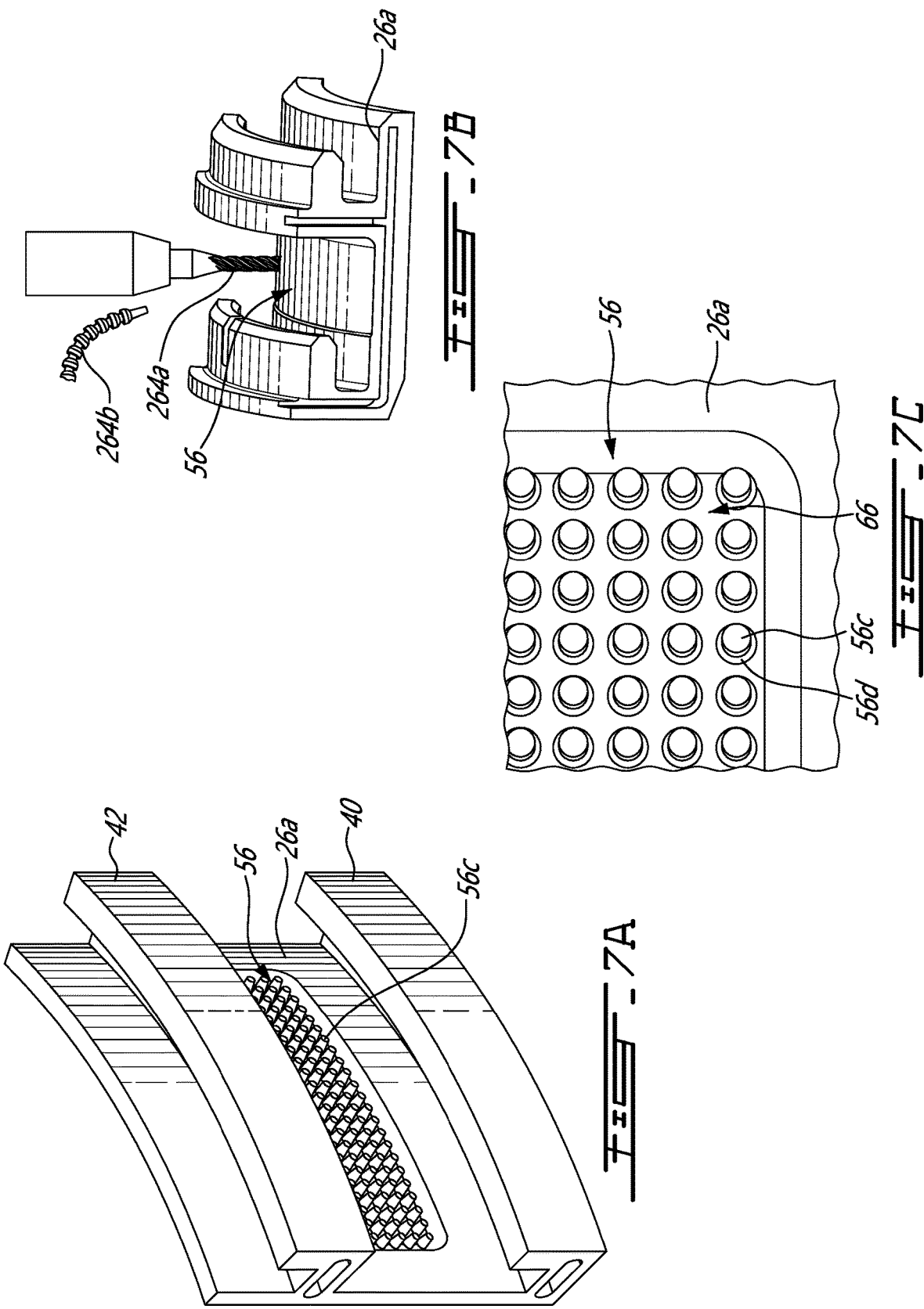

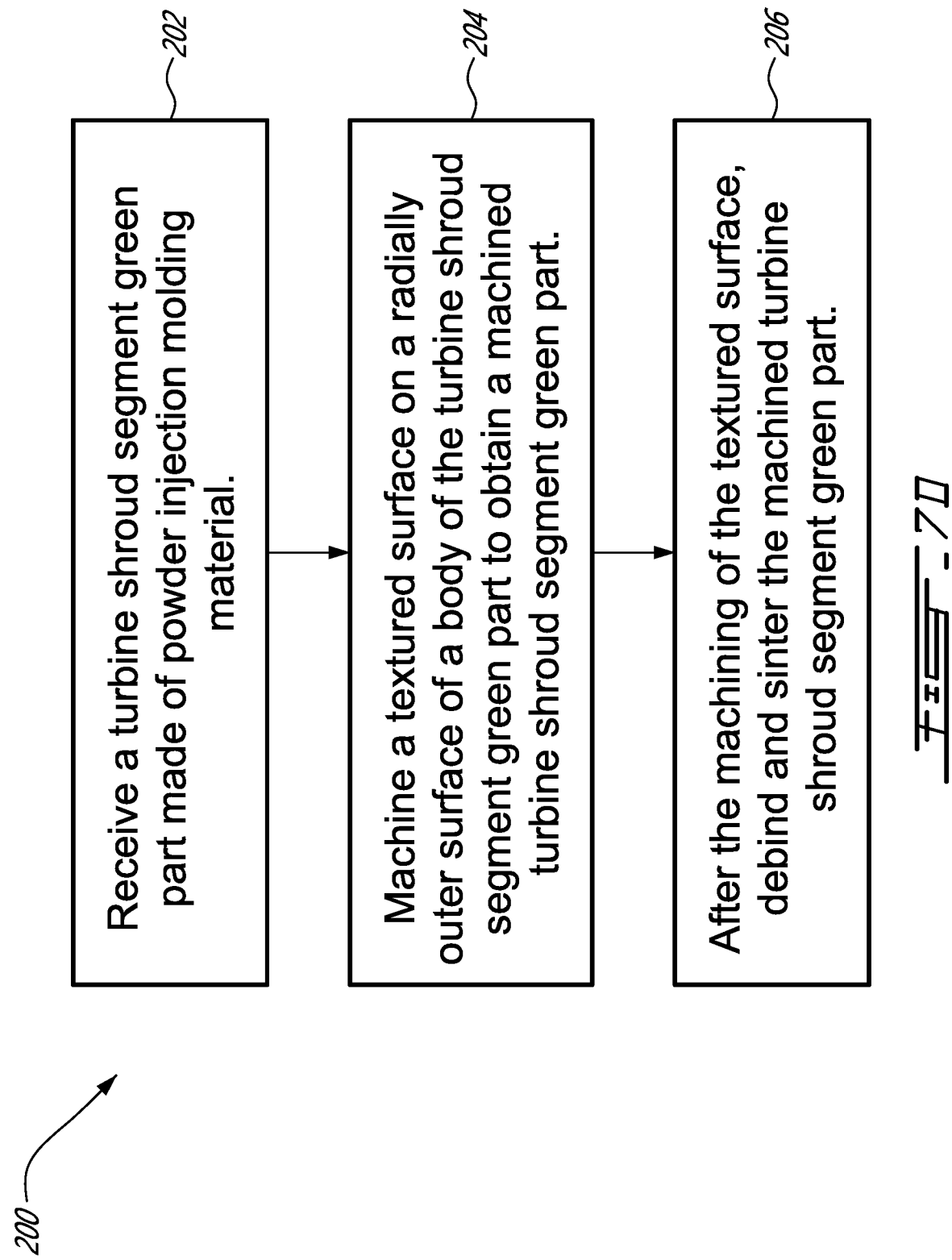

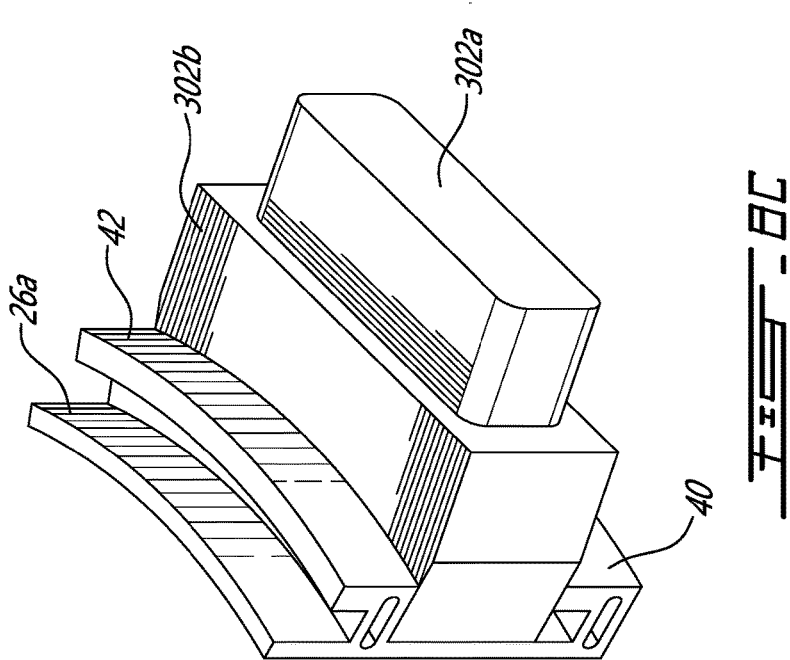
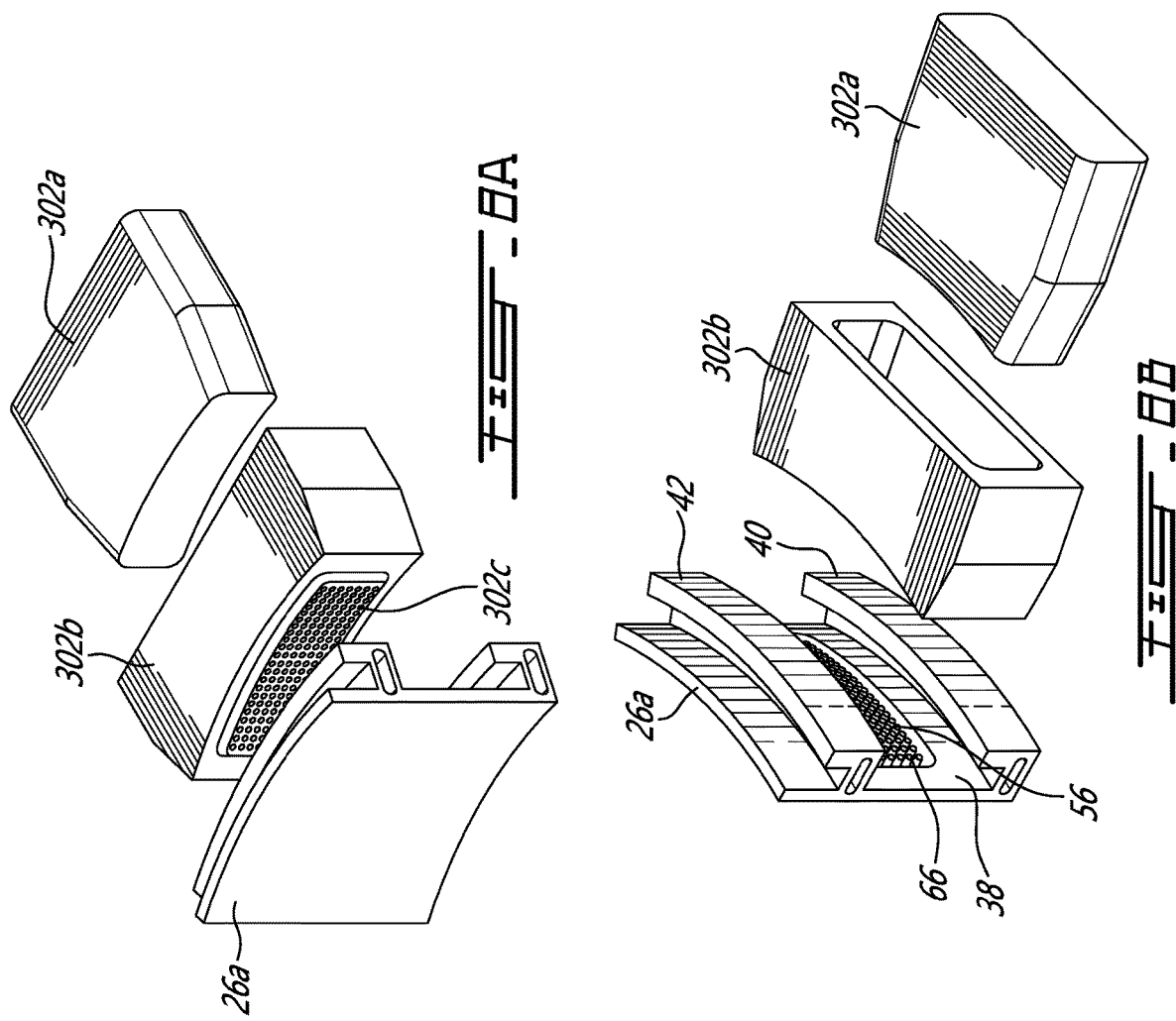

METHOD OF MANUFACTURING A TURBINE SHROUD SEGMENT

TECHNICAL FIELD

The application relates generally to methods of manufacturing a turbine shroud segment for a gas turbine engine.

BACKGROUND OF THE ART

Turbine shroud segments in gas turbine engines are exposed to hot gases and, thus, require cooling. Cooling air may be bled off from the compressor section, thereby reducing the amount of energy that can be used for the primary purpose of proving thrust. It is thus desirable to minimize the amount of air bleed from other systems to perform cooling. Various methods of cooling the turbine shroud segments may include directing the cooling flow through a core cavity within the turbine shroud segment. However, manufacturing turbine shroud segments including such feature has proven to be challenging.

Accordingly, improvements in methods of manufacturing turbine shroud segments are desirable.

SUMMARY

In accordance with one aspect, there is provided a method of manufacturing a turbine shroud segment for a gas turbine engine defining an engine axis, the method comprising the steps of receiving a turbine shroud segment green part made of powder injection molding material, machining an axial cooling flow passageway in the turbine shroud segment green part to obtain a machined turbine shroud segment green part, the axial cooling flow passageway extending along a direction having a component in an axial direction relative to the engine axis when the turbine shroud segment is mounted to the gas turbine engine, and after the machining of the axial cooling flow passageway, debinding and sintering the machined turbine shroud segment green part.

In some implementations, the machining the axial cooling flow passageway comprises peck drilling the axial cooling flow passageway with a drilling tool in a plurality of drilling cycles.

In some implementations, the axial cooling flow passageway has a diameter, and the peck drilling comprises, during a drilling cycle of the plurality of drilling cycles, plunging the drilling tool through the turbine shroud segment green part to a distance corresponding to more than five times the diameter of the axial cooling flow passageway.

In some implementations, the machining comprises blowing pressurized air on the drilling tool between two drilling cycles of the plurality of drilling cycles.

In some implementations, the machining comprises blowing pressurized air in the axial cooling flow passageway between two drilling cycles of the plurality of drilling cycles.

In some implementations, between two drilling cycles of the plurality of drilling cycles, the drilling tool retracts completely out of the axial cooling flow passageway.

In accordance with another aspect, there is provided a method of manufacturing a turbine shroud segment for a gas turbine engine defining an engine axis, the method comprising the steps of receiving a turbine shroud segment green part made of powder injection molding material, the turbine shroud segment green part including a body extending axially between a leading edge and a trailing edge and circumferentially between a first lateral edge and a second lateral edge, the body having a radially outer surface and a radially inner surface, machining a textured surface on the radially outer surface of the body to obtain a machined turbine shroud segment green part, and after the machining of the textured surface, debinding and sintering the machined turbine shroud segment green part.

In some implementations, the machining comprises forming a recessed portion on the radially outer surface.

In some implementations, the machining further comprises forming a plurality of turbulators protruding from the recessed portion on the radially outer surface.

In some implementations, the machining comprises forming each turbulator of the plurality of turbulators individually with a cutting tool.

In some implementations, the plurality of turbulators includes one or more of stand-offs having a cylindrical shape, peaks, valleys and crosses.

In some implementations, the machining comprises blowing pressurized air on at least one of the cutting tool and the turbulator being formed by the cutting tool.

In accordance with yet another aspect, there is provided a method of manufacturing a turbine shroud segment for a gas turbine engine defining an engine axis, the method comprising the steps of injecting powder injection molding material into a mold for forming a molded turbine shroud segment green part including a body extending axially between a leading edge and a trailing edge and circumferentially between a first lateral edge and a second lateral edge, the body having a radially outer surface and a radially inner surface, the mold having cavities defining negatives of features forming a textured surface on the radially outer surface of the body, and debinding and sintering the molded turbine shroud segment green part.

In some implementations, the textured surface comprises a recessed portion on the radially outer surface.

In some implementations, the textured surface comprises a plurality of turbulators protruding from the recessed portion on the radially outer surface.

In some implementations, the plurality of turbulators includes stand-offs having a frustoconical shape.

In some implementations, during the injecting of the powder injection molding material into the mold, air is evacuated from within the mold via a vent defined in the mold.

In some implementations, during the injecting of the powder injection molding material into the mold, the vent is fluidly connected to the cavities of the mold defining the plurality of turbulators.

In some implementations, the vent extends axially between adjacent support legs of the molded turbine shroud segment green part, the adjacent support legs extending radially outward from the radially outer surface of the turbine shroud segment green part.

In some implementations, the vent further extends radially outward from the radially outer surface of the turbine shroud segment green part.

DESCRIPTION OF THE DRAWINGS

Reference is now made to the accompanying figures in which:

FIG. 2B is a schematic cross-section of the turbine shroud assembly of FIG. 2A mounted radially outwardly in close proximity to the tip of a row of turbine blades of a turbine rotor;

FIG. 3B is a schematic perspective cross-section of a machined turbine shroud segment green part, with a drilling tool and an air nozzle;

FIG. 3C is a flowchart of a method of manufacturing a turbine shroud segment according to an embodiment of the present disclosure;

FIG. 5 is a perspective view of a turbine shroud segment according to another embodiment of the present disclosure;

FIG. 6 is a perspective view of a turbine shroud segment according to another embodiment of the present disclosure; and FIG. 7A is a perspective view of a turbine shroud segment green part according to another embodiment of the present disclosure;

FIG. 7B is a perspective of the turbine shroud segment green part of FIG. 7A, with a cutting tool;

FIG. 7C is a perspective, closed-up view of a textured surface of the turbine shroud segment green part of FIG. 7A;

FIG. 7D is a flowchart of a method of manufacturing a turbine shroud segment according to another embodiment of the present disclosure;

FIGS. 8A and 8B are exploded, perspective views of a turbine shroud segment green part according to another embodiment of the present disclosure, with a schematic portion of a mold and a schematic portion of an injector for metal injection molding;

FIG. 8C is a perspective view of the turbine shroud segment green part, schematic portion of a mold and schematic portion of an injector of FIGS. 8A and 8B;

DETAILED DESCRIPTION

In this description and the appended claims, the singular forms "a," "an," and "the" are intended to include the plural forms as well, unless the context clearly indicates otherwise.

Figure 1:
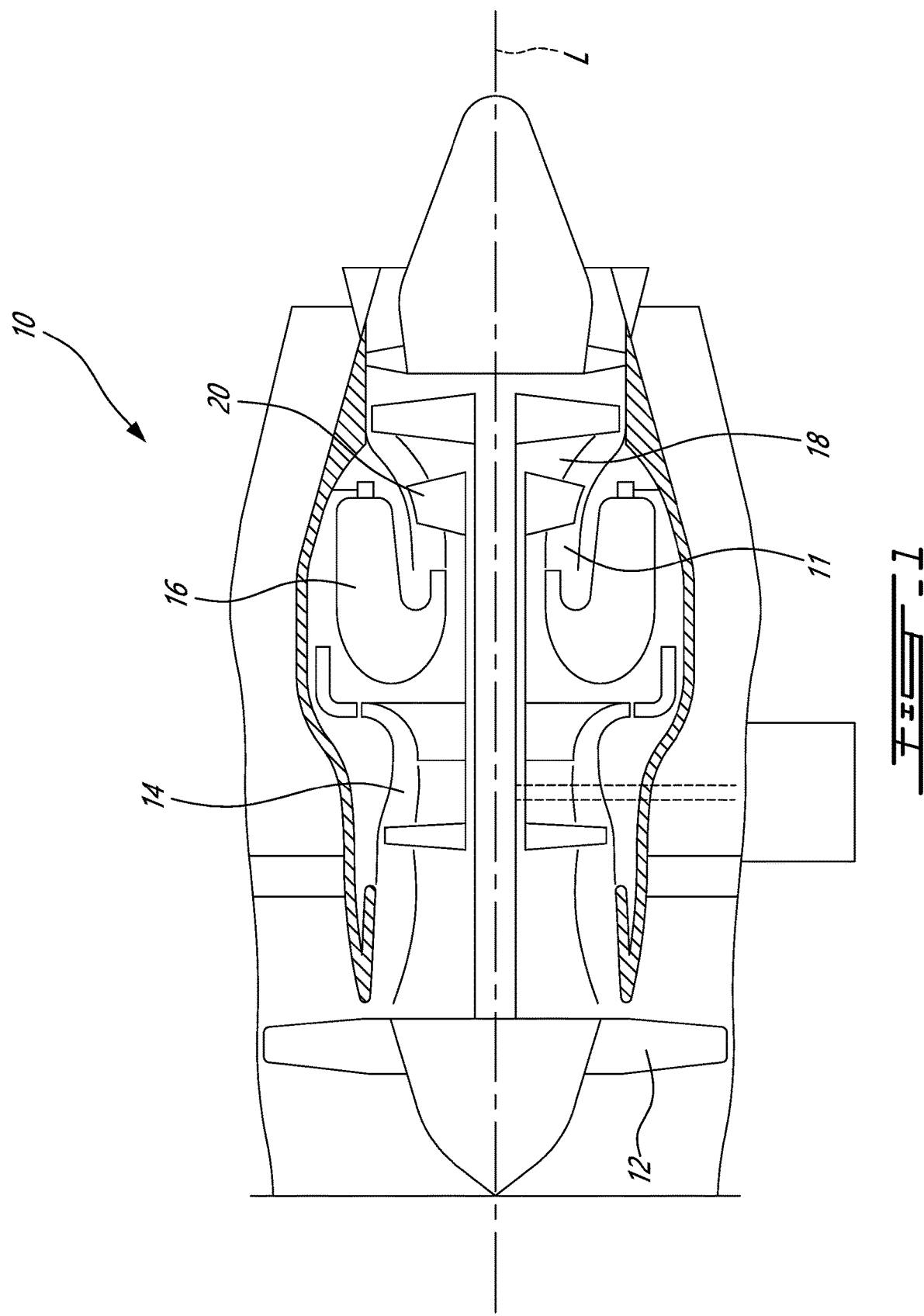
FIG. 1 is a schematic cross sectional view of a gas turbine engine.

FIG. 1 illustrates a gas turbine engine 10 of a type preferably provided for use in subsonic flight, generally comprising an annular gas path 11 disposed about an engine axis L. A fan 12, a compressor 14, a combustor 16 and a turbine 18 are axially spaced in serial flow communication along the gas path 11. More particularly, the engine 10 comprises a fan 12 through which ambient air is propelled, a compressor section 14 for pressurizing the air, a combustor 16 in which the compressed air is mixed with fuel and ignited for generating an annular stream of hot combustion gases, and a turbine 18 for extracting energy from the combustion gases.

As shown in FIGS. 1 and 2B, the turbine 18 includes turbine blades 20 mounted for rotation about the engine axis L. A turbine shroud assembly 22 extends circumferentially about the rotating blades 20. The shroud assembly 22 is disposed in close radial proximity to the tips 28 of the blades 20 and defines therewith a blade tip clearance 24 (FIG. 2B). The shroud assembly 22 includes a plurality of arcuate turbine shroud segments 26 spaced circumferentially to provide an outer flow boundary surface of the gas path 11 around the blade tips 28.

Figure 2A:
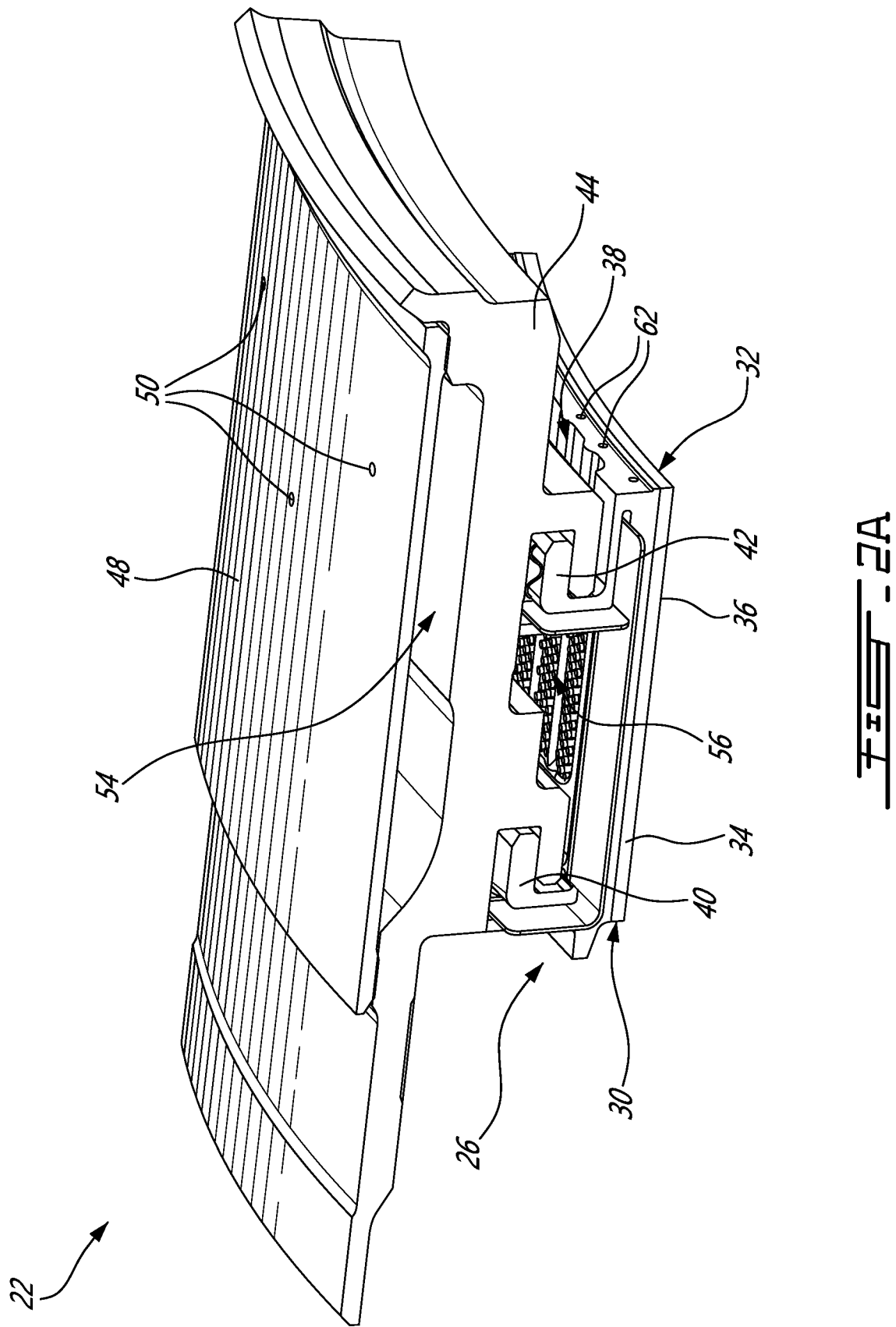
FIG. 2A is a perspective view of a turbine shroud assembly in accordance with an embodiment of the present disclosure.

In the embodiment shown in FIGS. 2A and 2B, each turbine shroud segment 26 has a body extending axially from a leading edge 30 to a trailing edge 32 and circumferentially between opposed axially extending sides or lateral edges 34. In the present disclosure, the terms "front" and "frontward" refer to a direction approaching the leading edge 30, while the terms "rear" and "rearward" refer to a direction approaching the trailing edge 32. The body has a radially inner surface 36 providing the outer flow boundary surface of the gas path 11 around the blade tip 28 and a radially outer surface 38 relative to the engine axis L. Front and rear support legs 40, 42 (e.g. hooks) extend from the radially outer surface 38 to hold the shroud segment 26 into a surrounding fixed structure 44 of the engine 10, illustratively a casing for the shroud segment 26. As shown in FIG. 2B, the casing 44 includes impingement holes 46 for directing a flow of coolant C towards the radially outer surface 38 of the shroud, as will be discussed in further detail below. An optional top plate 48 may be affixed or otherwise installed above the casing 44, the top plate 48 including one or more additional impingement holes 50 for providing cooling to the casing 44.

According to some embodiments, each shroud segment 26 has a cooling scheme directing a flow of coolant C across the radially outer surface 38 and through the body of the shroud segment 26 from a front or upstream end portion of the body of the shroud segment 26 to a rear or downstream end portion thereof, as will be discussed in further detail below. This may allow to take full benefit of the pressure delta between the leading edge 30 (the front end) and the trailing edge 32 (the rear end). A cooling plenum 52 is defined between the front and rear support legs 40, 42 and the casing 44 supporting the shroud segments 26. The cooling plenum 52 is connected in fluid flow communication to a source of the flow of coolant C. The coolant can be provided from any suitable source but is typically provided in the form of bleed air from one of the compressor stages. If the top plate 48 is present, an additional cooling plenum 54 may be defined between the top plate 48 and the casing 44, directing the flow of coolant C towards the impingement hole(s) 46 and providing a certain degree of cooling to the casing 44 if desired.

The flow of coolant C exiting the impingement hole(s) 46 is directed or impinged onto a textured surface 56 on the radially outer surface 38. As will be discussed in further detail below, the textured surface 56 may promote heat transfer between the flow of coolant C and the shroud segment 26, for instance by increasing the wetted surface area of the radially outer surface 38 and/or by increasing the turbulence in the flow of coolant C. Various angles for the impingement hole(s) may be considered, for instance based on the desired level of cooling for the shroud segment 26. In the embodiment shown in FIG. 2B, the impingement holes 46 direct the flow of coolant C in a radially inward direction towards the textured surface 56, while in the embodiment shown in FIG. 3A, the impingement holes 46 are angled towards the trailing edge 32 of the body of the shroud segment 26, thereby providing a rearward axial component. Other angles for the impingement hole(s) 46 may be contemplated as well. In various cases, the impingement holes 46 may be staggered axially along the casing 44 with respect to the engine axis L, distributing the impingement holes 46 along the casing 44 and thus improving the heat transfer between the flow of coolant C and the textured surface 56. Other positioning arrangements for the impingement holes 46 may be contemplated as well. As will be discussed in further detail below, the textured surface 56 may include peaks and valleys and/or turbulators to promote heat transfer between the shroud segment 26 and the flow of coolant C by increasing the wetted surface area and/or increasing the generated turbulence of the flow of coolant.

The cooling scheme further includes a plurality of cooling inlets 58 for directing the flow of coolant C from the cooling plenum 52 into a front or upstream end of the body of the shroud segment 26 after the coolant C has interacted with the textured surface 56, as will be discussed in further detail below. According to the illustrated embodiment, although not necessarily the case in all embodiments, the cooling inlets 58 are provided as a transverse row of inlet passages along the front support leg 40. The cooling inlets 58 then direct the flow of coolant C through a cooling flow passageway, illustratively a plurality of axial cooling flow passageways 60, passing through the body of the shroud segment 26. Illustratively, the cooling inlets 58 include inlet ends opening on the cooling plenum 52 just downstream (rearwardly) of the front support leg 40 and an outlet end opening to the cooling flow passageway underneath the front support leg 40, as will be discussed in further detail below. As can be appreciated from FIG. 2B, each cooling inlet 58 may be angled to receive the flow of coolant C from the cooling plenum 52. The angle of inclination of the cooling inlets 58 may be an acute angle as measured from the radially outer surface 38 of the shroud segment 26 and oriented to direct the coolant toward the leading edge 30 of the shroud segment 26. According to the illustrated embodiment, the inlets 58 are angled at about 45 degrees from the radially outer surface 38 of the shroud segment 26, although other angles may be contemplated as well. In various cases, the acute angling of inlets 58 may direct the flow of coolant C towards the leading edge 30 within the body of the shroud segment 26, which may additionally promote heat transfer between the flow of coolant C and the shroud segment 26. As the combined cross-sectional area of the inlets 58 is small relative to that of the plenum 52, the coolant may be conveniently accelerated as it is fed into the cooling flow passageway. The momentum gained by the coolant as it flows through the inlet passages may contribute to proving enhanced cooling at the front end portion of the shroud segment 26.

Figure 3A:
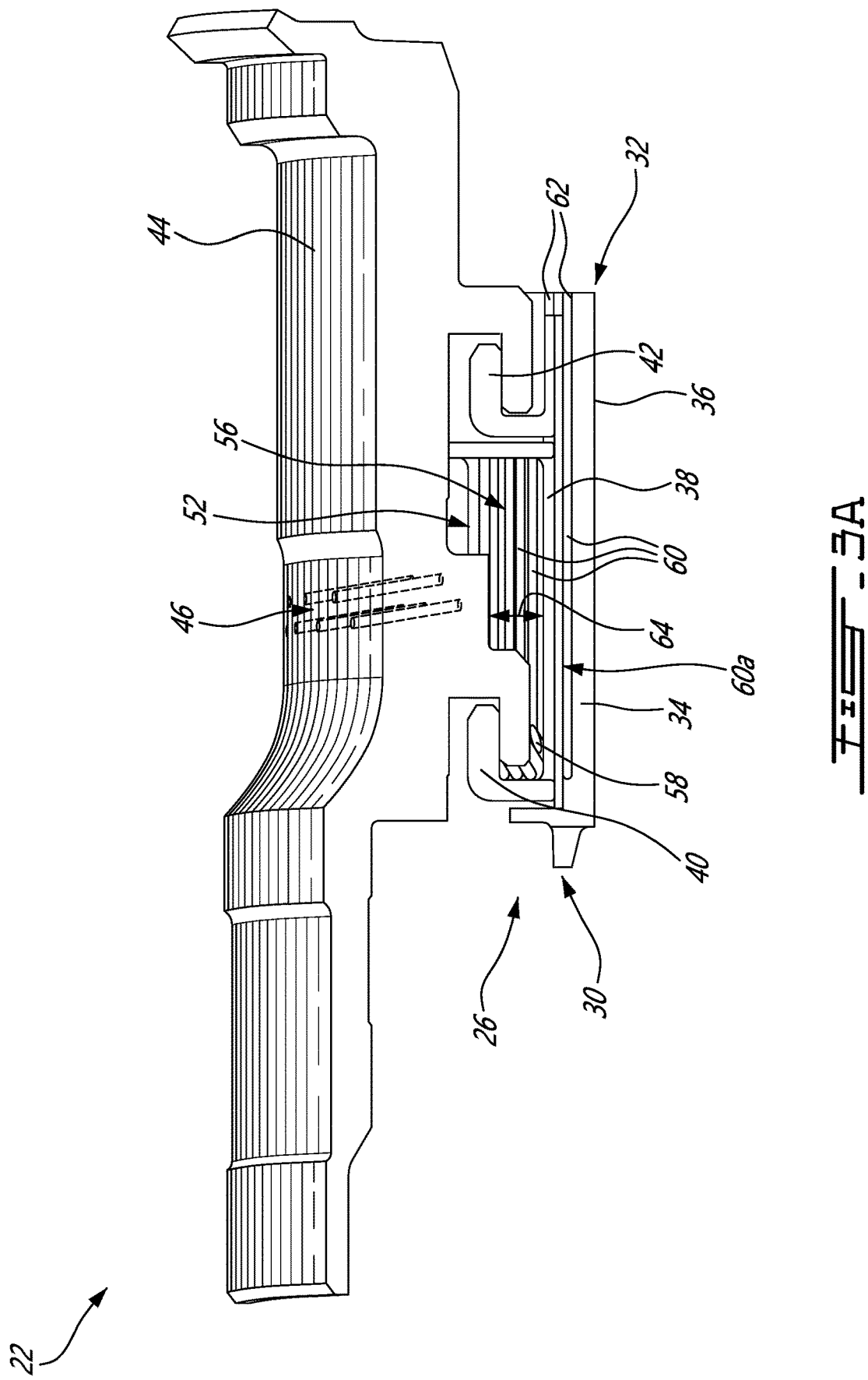
FIG. 3A is a raised side view of the turbine shroud segment assembly of FIG. 2A.

As shown in FIG. 3A, the axial cooling flow passageways 60 are illustratively parallel cylindrical passageways. Other shapes for the axial passageways 60 may be contemplated as well. As discussed above, the axial passageways 60 begin at the cooling inlets 58 and follow a length of the body of the shroud segment 26 towards the trailing edge 32. In other words, the axial passageways 60 have a portion 60a thereof extending along a direction having a component in an axial direction relative to the engine axis L when the turbine shroud segment 26 is mounted to the gas turbine engine 10. In some implementations, a ratio of a length of the portion 60a the axial passageways 60 in the direction having a component in the axial direction relative to the engine axis L over the diameter of the axial passageway is greater than five, and in some implementations, greater than ten. In various embodiments, the axial passageways 60 may promote heat transfer between the shroud segment 26, in particular from the radially inner surface 36, and the flow of coolant C. The number and dimensions of the axial passageways 60 may vary according to the cooling requirements of the shroud segment 26 and the overall dimensions of the shroud segment 26. For instance, a greater number of axial passageways 60 may be required to accommodate a greater flow of coolant C, while the diameter of the illustratively cylindrical axial passageways 60 may be limited by the overall thickness of the body of the shroud segment 26.

The cooling scheme further comprises a plurality of cooling outlets 62 for discharging coolant from the axial passageways 60. As shown in FIG. 2A, the plurality of outlets 62 may include a row of outlet passages distributed along the trailing edge 32 of the shroud segment 26. The cooling outlets 62 are sized to meter the flow of coolant discharged through the trailing edge 32 of the shroud segment 26. In the shown embodiment, the number of cooling inlets 58 and the number of cooling outlets 62 each correspond with the number of axial passageways 60. In some cases, the axial passageways 60 may outnumber the cooling inlets 58 and cooling outlets 62 (or vice-versa), for instance if the axial passageways 60 were to converge or diverge towards the inlets 58 or outlets 62.

Referring now to FIGS. 3B and 3C, a method 100 of manufacturing the turbine shroud segment 26 will be described. At step 102, a turbine shroud segment green part 26a is received. The turbine shroud segment green part 26a is formed using metal injection molding (MIM) techniques. As is typical in MIM, a feedstock is injected into a mold cavity to obtain a green part, also referred to herein as "green body". The feedstock can include high temperature resistant powder metal alloys, such as a nickel superalloy. Other high temperature resistant material powders which may include one material or a mix of materials could be used as well. The feedstock is a mixture of the material powder and of a binder which may include one or more binding material(s). In a particular implementation, the binder includes an organic material which is molten above room temperature (20° C.) but solid or substantially solid at room temperature. The binder may include various components such as surfactants which are known to assist the injection of the feedstock into the mold for production of the green part. In a particular implementation, the binder includes a mixture of binding materials, for example including a lower melting temperature polymer, such as a polymer having a melting temperature below 100° C. (e.g. paraffin wax, polyethylene glycol, microcrystalline wax) and a higher melting temperature polymer or polymers, such as a polymer or polymers having a melting temperature above 100° C. (e.g. polypropylene, polyethylene, polystyrene, polyvinyl chloride). Different combinations are also possible. In a particular implementation, the material powder is mixed with the molten binder and the suspension of injection powder and binder is injected into the mold cavity and cooled to a temperature below that of the melting point of the binder. "Green state", "green part" or "green body" as discussed herein refers to a molded part produced by the solidified binder that holds the injection powder together.

At step 104, the method 100 involves machining each of the axial cooling flow passageway 60 in the turbine shroud segment green part 26a to obtain a machined turbine shroud segment green part. Since the feedstock is wax and/or polymer based, machining the green part can be performed with cutting feeds and speeds that are higher and cutting forces that are lower than typical feeds, speeds and forces for the machining of solid metal (for example the same metal as that found in powder form in the green body), and even when compared with "soft" metals such as aluminum. In a particular implementation, a machine tool that is designed for machining wax and plastics (e.g. small desktop CNC milling machine) is used to machine the green part. In a particular implementation, the cutting feeds and speeds are similar to that used during the machining of wax. In a particular implementation, the metal powder present in the green part provides for an increased material conductivity when compared to the binder material alone, which may help dissipate heat that may be generated during machining. When in the green state, the green part has a surface hardness that is smaller than the surface hardness of the sintered part.

To perform the machining step 104, the turbine shroud segment green part is clamped/held using suitable retaining fixture(s), and a drilling tool 164a is used to form the axial cooling flow passageways 60. In some embodiments, an air nozzle 164b is located adjacent the drilling tool 164a, and is adapted to supply pressurized air to the drilling tool 164a to blow feedstock chips out of the drilling tool 164a when the drilling tool 164a is withdrawn from the green part 26a. In some implementations, in order to form each one of the axial cooling flow passageways 60, the drilling tool 164a uses peck drilling techniques to incrementally drill each of the axial passageways 60 in a plurality of drilling cycles. In some implementations, during a drilling cycle of the plurality of drilling cycles, the drilling tool 164a is plunged through the shroud segment green part 26a to a distance corresponding to more than five times the diameter of the axial cooling flow passageway 60. In some implementations, the drilling tool 164a is plunged through the shroud segment green part 26a to a distance corresponding to more than ten times the diameter of the axial cooling flow passageway 60. In some implementations, between two drilling cycles of the plurality of drilling cycles, the drilling tool 164a retracts completely out of the axial cooling flow passageway 60 being drilled.

When the drilling tool 164a is retracted, i.e. between two drilling cycles of the plurality of drilling cycles, pressurized air supplied by the air nozzle 164b is blown in the axial cooling flow passageway 60 to remove chips of feedstock present in the axial cooling flow passageway 60. Using the pressurized air supplied by the air nozzle 164b to evacuate chips of feedstock from the drilling tool 164a and from the axial cooling flow passageway 60 being drilled keeps the drilling tool 164a and the turbine shroud segment green part cool during step 104. Such cooling also limits the amount of feedstock chips sticking to the turbine shroud segment green part 26a during step 104. Furthermore, the pressurized air supplied by the air nozzle 164b evacuating chips of feedstock from the drilling tool 164a and from the axial cooling flow passageway 60 being drilled limits fragilization and/or damages caused to the turbine shroud segment green part 26a during the formation of the axial passageways 60. In other words, because the turbine shroud segment green part 26a is fragile and brittle, forming the axial passageways 60 using the aforementioned peck drilling techniques and pressurized air blowing reduces the fragilization and/or damages caused to the turbine shroud segment green part 26a during the formation of the axial passageways 60.

At step 106, the method 100 involves, after step 104, debinding and sintering the machined shroud segment green part 26a. The debinding and sintering step 106 involves heating the machined shroud segment green part 26a to a sintering temperature that is below the melting point of the material particles present in the feedstock, which results in metallurgical bonding of the material particles through cohesion and densification. After the debinding and sintering step 106, the machined shroud segment green part 26a is then considered a sintered part.

Figure 4:
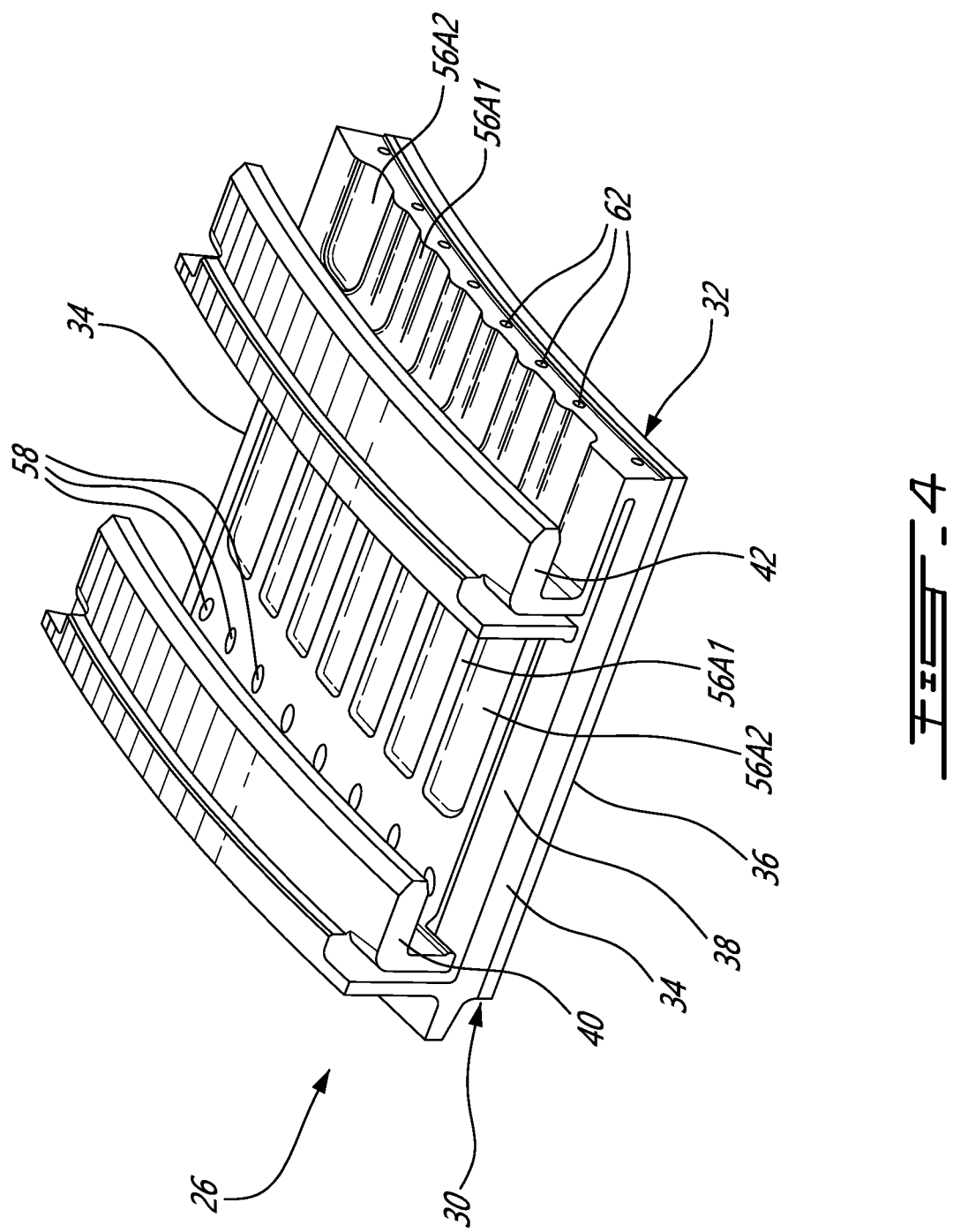
FIG. 4 is a perspective view of a turbine shroud segment according to an embodiment of the present disclosure.

Referring to FIG. 4, the textured surface 56 on the radially outer surface 38 of the shroud segment 26 may include a series of alternating parallel peaks 56A1 and valleys 56A2, thus increasing the wetted surface area of the radially outer surface 38 with reference to a comparable shroud segment having a substantially smooth radially outer surface 38. As the flow of coolant C is impinged onto the radially outer surface 38, the peaks 56A1 and valleys 56A2 provide an increased wetted surface area for the flow of coolant C, thus promoting heat transfer between the radially outer surface 38 and the flow of coolant C. The peaks 56A1 and valleys 56A2 may further aid in moderating the operating conditions while cooling the shroud segment 26. The valleys 56A2 correspond to recessed portions of the radially outer surface 38, while the peaks 56A1 correspond to raised portions separating the valleys 56A2. As such, the formation of the valleys 56A2, for instance by removing material from the radially outer surface 38, may contribute to an overall weight reduction for the shroud segment 26. As shown in FIG. 4, the positioning of the valleys 56A2 may correspond to the locations of the axial passageways 60 through the body of the shroud segment 26. As such, the peaks 56A1 and valleys 56A2 may be parallel to the axial passageways 60 and thus may follow a direction from the leading edge 30 to the trailing edge 32, illustratively beginning rearward of the cooling inlets 58 and terminating in front of the rear support leg 42, with optional additional peaks 56A1 and valleys 56A2 beginning rearward of the rear support leg 42 and terminating at the trailing edge 32. The number and width of the peaks 56A1 may depend on the number and sizing of the corresponding axial passageways 60, although in other cases additional peaks 56A1 may be formed between the peaks 56A1 corresponding to the axial passageways 60. Similarly, the number and width of the valleys 56A2 may depend on the number and spacing between adjacent peaks 56A1. The depth of the valleys 56A2 may vary as a function of the desired surface area increase of the radially outer surface 38 while ensuring the body of the shroud segment 26 maintains a minimum thickness to ensure its structural integrity.

As the flow of coolant C is impinged onto the radially outer surface 38 in a direction towards the cooling inlets 58, the increase in surface area provided by the peaks 56A1 and valleys 56A2 increases the rate of heat transfer between the radially outer surface 38 and the flow of coolant C, thus improving the overall cooling effect on the shroud segment 26. Referring additionally to FIG. 3A, to further improve cooling performance, a ratio between the distance 64 between the outlets of the impingement hole(s) 46 and the radially outer surface 38 and the diameter of the impingement hole(s) 46 may be optimized. For instance, such a distance-to-diameter ratio may vary between 3 and 8 for optimal impingement performance, although other ratios may be contemplated as well. In addition, in various embodiments, the impingement hole(s) 46 may be positioned in the casing 44 and angled so that the flow of coolant C is impinged towards locations on the radially outer surface 38 that are known to be "hot spots", i.e. locations that may require a more direct flow of coolant C to attain a desired level of cooling.

In various embodiments, the textured surface 56 may further include a plurality of turbulators to further promote heat transfer between the radially outer surface 38 and the flow of coolant C, i.e. to improve cooling of the shroud segment 26. Such turbulators may include raised portions on the outer surface 38 to increase turbulence in the flow of coolant C and/or increase the wetted surface area of the outer surface 38.

Referring to FIG. 5, the turbulators may further or alternatively include a plurality of stand-offs 56C or pins. The term "stand-offs" used herein refers to a plurality of protrusions emanating from a surface, in this case the radially outer surface 38, to create turbulence in the flow of coolant C. The stand-offs 56C may additionally increase the wetted surface area of the radially outer surface 38, further promoting heat transfer between the radially outer surface 38 and the flow of coolant C. Illustratively, the stand-offs 56C are disposed within valleys 56A2 in a staggered formation, alternating between two and three stand-offs 56C per row. However, other arrangements may be contemplated as well. For instance, a greater number of stand-offs 56C may be arranged side-by-side if the corresponding valleys 56A2 were wider than the shown valleys 56A2. Additionally or alternatively, the sizing of the stand-offs 56C and the spacing between adjacent stand-offs 56C may be altered to increase or decrease the overall number of stand-offs. The number of stand-offs 56C may vary due to, for instance, the desired gains in generated turbulence and/or wetted surface area and various manufacturing constraints. The height of the stand-offs 56C may vary as well, for instance based on the depth of the valleys 56A2 and/or the desired level of generated turbulence. In some cases, the sizing of the stand-offs 56C may vary from one standoff to another. As the flow of coolant C is impinged onto the radially outer surface 38, the peaks 56A1 and valleys 56A2 provide an increased wetted surface area for the flow of coolant C while the stand-offs 56C create turbulence in the flow of coolant C, thus promoting heat transfer between the radially outer surface 38 and the flow of coolant C. Other types and/or shapes of turbulators may be considered as well. While the sections of the peaks 56A1 and valleys 56A2 rearward of the rear support leg 42 are not shown to include stand-offs 56C, in other cases, for instance if additional sources of cooling flow were provided to different sections of the shroud segment 26, stand-offs 56C may be added to these rearward peaks 56A1 and valleys 56A2 to enhance cooling at the rear end of the shroud segment 26.

In various embodiments, the textured surface 56 on the radially outer surface 38 may include a plurality of turbulators without peaks and valleys. For instance, depending on the given cooling requirements of a specific application, the generation of turbulence, for instance via crosses and/or stand-offs, in the flow of coolant C may provide sufficient cooling to the shroud segment 26 without the need for the increased surface area provided by the peaks and valleys. Referring to FIG. 6, there is shown a plurality of turbulators, illustratively a plurality of stand-offs 56C, protruding from an optional recessed portion 66 of the radially outer surface 38 to generate turbulence in the flow of coolant C to promote heat transfer between the radially outer surface 38 and the flow of coolant C. In various cases, the optional recessed portion 66 may reduce the overall weight of the shroud segment 26 due to the removed material from the radially outer surface 38, and its depth may vary, for instance based on the desired weight of the shroud segment 26, the desired height of the turbulators disposed within, and the sizing of the axial passageways 60 disposed within the body of the shroud segment 26. In other cases, the turbulators may be disposed directly on the radially outer surface 38 in the absence of the recessed portion 66. In other cases, the turbulators may include crosses 56B or a combination of crosses 56B and stand-offs 56C. Other protruding turbulator shapes may be considered as well.

Various embodiments of the above-described cooling schemes thus provide for a flow of coolant C being impinged by one or more impingement holes 46 in a structure 44 of the engine 10 onto a textured surface 56 on the radially outer surface 38 of the shroud segment 26. Such textured surface 56 may include peaks 56A1 and valleys 56A2 and/or turbulators such as crosses 56B or stand-offs 56C to promote heat transfer by increasing the wetted surface area of the radially outer surface 38 and/or generating turbulence in the flow of coolant C. The flow of coolant C is then directed through cooling inlets 58 through axial passageways 60 within the body of the shroud segment 26 to provide additional cooling to the shroud segment 26 before exiting via a transverse row of outlets 62 provided at the trailing edge 32 of the shroud segment 26.

In this way, in various embodiments, the flow of coolant C may effectively and uniformly cool the entire shroud segment 26 via heat transfer at the radially outer surface 38 and within the body of the shroud segment 26. In various embodiments, the above-described shroud segments 26 may increase the overall efficiency of the gas turbine engine 10 by, for instance, reducing weight and providing additional cooling. In addition, the lifespan of the shroud segment 26 may be increased due to the increased cooling capacity. Further, in various embodiments, the improved cooling efficiency provided by the various cooling schemes may reduce the quantity of coolant flow required to achieve the desired level of cooling of the shroud segment 26. In addition, in various embodiments the gas turbine engine 10 may be able to operate with a higher gas path temperature due to the improved cooling efficiency capabilities.

Referring to now FIGS. 7A to 7D, a method 200 of manufacturing a turbine shroud segment 26 will be described. At step 202, a turbine shroud segment green part 26a is received. The turbine shroud segment green part 26a is formed using metal injection molding (MIM) techniques. The turbine shroud segment green part 26a is similar to the turbine shroud segment green part 26a described with reference to step 102 of the method 100 described above.

At step 204, the textured surface 56 is machined on the radially outer surface 38 to obtain a machined turbine shroud segment green part. To perform the machining step 204, the turbine shroud segment green part is clamped/held using suitable retaining fixture(s), and a cutting tool 264a is used to form the features of the textured surface 56, i.e. one or more of the recessed portion 66, peaks 56A1, valleys 56A2, crosses 56B and stand-offs 56C. In the present implementation, the cutting tool 264a is a short and small endmill adapted to cut the turbine shroud segment green part 26a to define the features of the textured surface 56. For example, the cutting tool 264a is adapted to define each of the turbulators individually. Referring to FIG. 7C, the turbulators are stand-offs 56C. Each of the stand-offs 56C is individually defined by the cutting tool 264a. Each one of the stand-offs 56C has a cylindrical shape, and a rounded portion 56D extending between the recessed portion 66 and the cylindrically shaped portion of the stand-off 56C. Other shapes and configurations for the stand-offs 56C may be considered in other implementations.

Referring to FIG. 7B, in some embodiments, during step 204, an air nozzle 264b is located adjacent the cutting tool 264a, and is adapted to supply pressurized air to the cutting tool 264a to blow feedstock chips away from the cutting tool 264a. Using the pressurized air supplied by the air nozzle 264b to evacuate chips of feedstock from the cutting tool 264a and the feature of the textured surface 56 being formed keeps the cutting tool 264a and the turbine shroud segment green part 26a cool during step 204. Such cooling also limits the amount of feedstock chips sticking to the turbine shroud segment green part 26a during step 204. Furthermore, the pressurized air supplied by the air nozzle 264b evacuating chips of feedstock from the cutting tool 264a limits fragilization and/or damages caused to the turbine shroud segment green part 26a during the formation of the features of the textured surface 56. In other words, because the turbine shroud segment green part 26a is fragile and brittle, forming the features of the textured surface 56 using the aforementioned pressurized air reduces the fragilization and/or damages caused to the turbine shroud segment green part 26a during the formation of the textured surface 56.

At step 206, the method 200 involves debinding and sintering the machined shroud segment green part 26a. The debinding and sintering step 206 involves heating the machined shroud segment green part 26a to a sintering temperature that is below the melting point of the material particles present in the feedstock, which results in metallurgical bonding of the material particles through cohesion and densification. After the debinding and sintering step 206, the machined shroud segment green part 26a is then considered a sintered part.

Figure 8E:
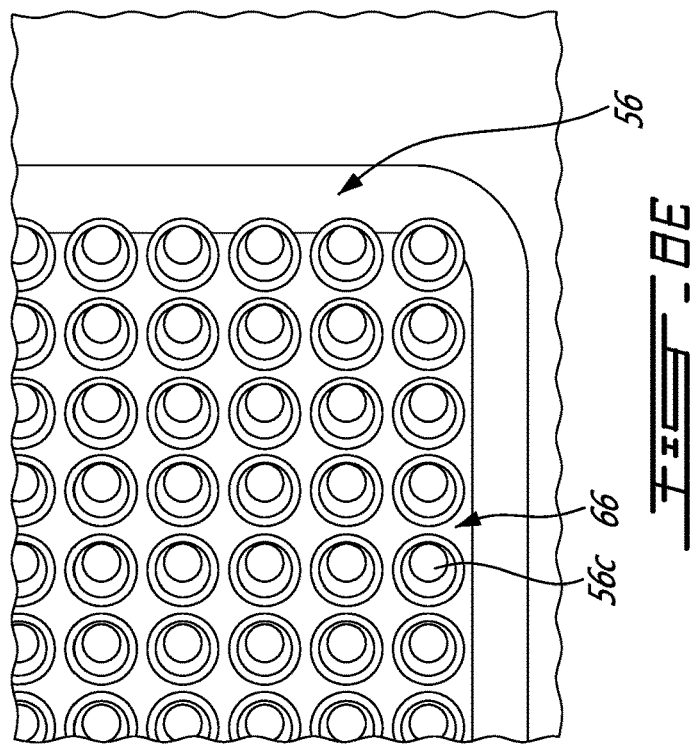
FIG. 8E is a perspective, closed-up view of a textured surface of the turbine shroud segment green part of FIGS. 8A and 8B.
Figure 8D:
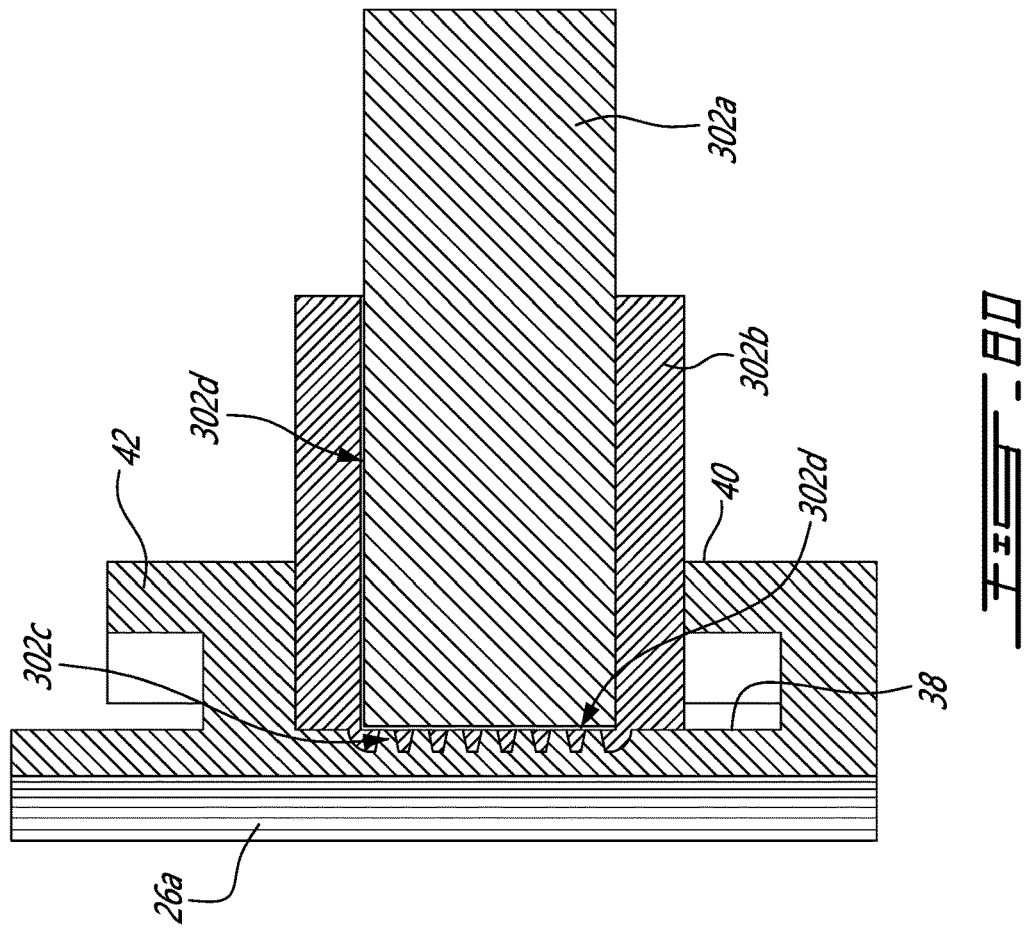
FIG. 8D is a cross-section view of the turbine shroud segment green part, schematic portion of a mold and schematic portion of an injector of FIG. 8C.
Figure 8F:
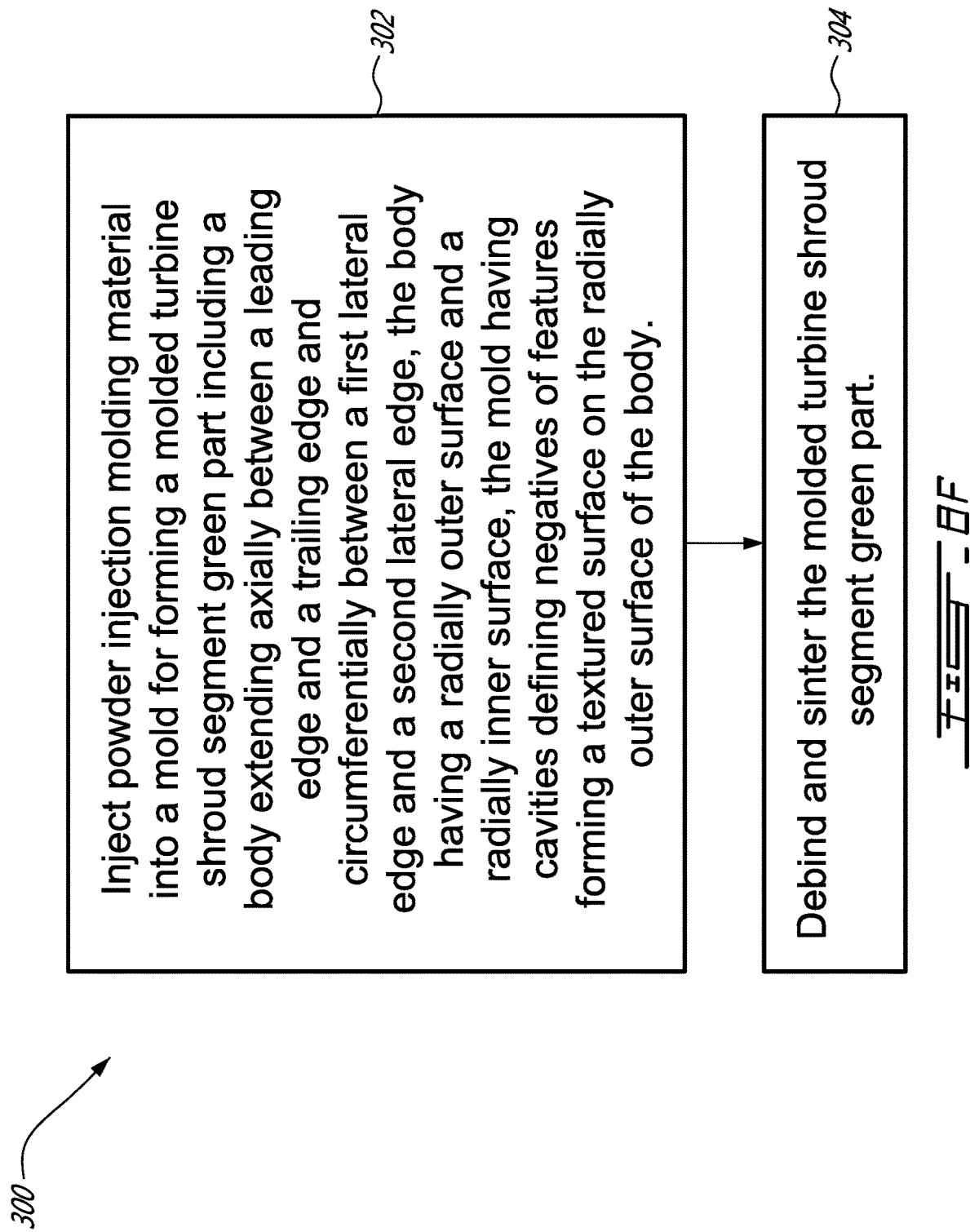
FIG. 8F is a flowchart of a method of manufacturing a turbine shroud segment according to another embodiment of the present disclosure.

Referring now to FIGS. 8A to 8F, a method 300 of manufacturing a turbine shroud segment 26 will be described. At step 302, powder injection molding material is injected by an injector 302a into a mold 302b for forming a metal injection molded turbine shroud segment green part 26a. As best seen in FIG. 8B, the mold 302b has cavities 302c defining negatives of the features forming the textured surface 56 on the radially outer surface 38 of the body of the turbine shroud segment green part 26a. The mold 302b also defines the recessed portion 66. In some implementations, the mold 302b has other cavities defining the negative of one or more of the recessed portion 66, peaks 56A1, valleys 56A2, crosses 56B and stand-offs 56C. In the present implementation and as best seen in FIG. 8E, the stand-offs 56C have a frustoconical shape to allow for unmolding. Step 302 is performed using low pressure MIM to ensure that the feedstock fills the cavities 302c of the mold 302b. Mold temperature is also controlled during step 302. If too hot, the feedstock will stick. If too cold, the feedstock will not fill the cavities 302c properly. During step 302, in order to properly fill the cavities 302c with the feedstock for forming the textured surface 56, air is evacuated from within the mold 302b via a vent 302d (FIG. 8D) defined in the mold 302b. The vent 302d is fluidly connected to the cavities 302c of the mold 302b defining the turbulators, and air that would otherwise be trapped between the mold 302b and the feedstock being injected is evacuated through the vent 302d. As best seen in FIG. 8D, the vent 302d extends axially between adjacent support legs 40, 42 of the turbine shroud segment green part 26a, the adjacent support legs 40, 42 extending radially outward from the radially outer surface 38 of the turbine shroud segment green part 26a. The vent 302d also extends radially outward from the radially outer surface 38 of the turbine shroud segment green part 26a.

At step 304, the method 300 involves debinding and sintering the molded turbine shroud segment green part 26a. The debinding and sintering step 304 involves heating the turbine shroud segment green part 26a to a sintering temperature that is below the melting point of the material particles present in the feedstock, which results in metallurgical bonding of the material particles through cohesion and densification. After the debinding and sintering step 304, the turbine shroud segment green part 26a is then considered a sintered part.

Using any one of, or a combination of, the methods 100, 200, 300 offer an alternative to manufacturing the turbine shroud segments using casting or machined parts. More particularly, the methods 100, 200, 300 allow for the formation of cooling features on turbine shroud segments 26 in a cost effective manner compared to other manufacturing methods.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of manufacturing a turbine shroud segment for a gas turbine engine defining an engine axis, the method comprising the steps of:
   receiving a turbine shroud segment green part made of powder injection molding material;
   machining an axial cooling flow passageway in the turbine shroud segment green part to obtain a machined turbine shroud segment green part, the axial cooling flow passageway extending along a direction having a component in an axial direction relative to the engine axis when the turbine shroud segment is mounted to the gas turbine engine, wherein the machining the axial cooling flow passageway comprises peck drilling the axial cooling flow passageway with a drilling tool in a plurality of drilling cycles, and wherein the axial cooling flow passageway has a diameter, and the peck drilling comprises, during a drilling cycle of the plurality of drilling cycles, plunging the drilling tool through the turbine shroud segment green part to a distance corresponding to more than five times the diameter of the axial cooling flow passageway; and
   after the machining of the axial cooling flow passageway, debinding and sintering the machined turbine shroud segment green part.

2. The method of claim 1, wherein the machining comprises blowing pressurized air on the drilling tool between two drilling cycles of the plurality of drilling cycles.

3. The method of claim 1, wherein the machining comprises blowing pressurized air in the axial cooling flow passageway between two drilling cycles of the plurality of drilling cycles.

4. The method of claim 1, wherein, between two drilling cycles of the plurality of drilling cycles, the drilling tool retracts completely out of the axial cooling flow passageway.

5. A method of manufacturing a turbine shroud segment for a gas turbine engine defining an engine axis, the method comprising the steps of:
   receiving a turbine shroud segment green part made of powder injection molding material, the turbine shroud segment green part including a body extending axially between a leading edge and a trailing edge and circumferentially between a first lateral edge and a second lateral edge, the body having a radially outer surface and a radially inner surface;

machining a textured surface on the radially outer surface of the body to obtain a machined turbine shroud segment green part, peck drilling an axial cooling flow passageway in the turbine shroud segment green part in a plurality of drilling cycles, the axial cooling flow passageway having a diameter, and the peck drilling comprises, during a drilling cycle of the plurality of drilling cycles, plunging the drilling tool through the turbine shroud segment green part to a distance corresponding to more than five times the diameter of the axial cooling flow passageway; and after the machining of the textured surface and the peck drilling of the axial cooling flow passageway, debinding and sintering the machined turbine shroud segment green part.

6. The method of claim 5, wherein the machining comprises forming a recessed portion on the radially outer surface.

7. The method of claim 6, wherein the machining further comprises forming a plurality of turbulators protruding from the recessed portion on the radially outer surface.

8. The method of claim 7, wherein the machining comprises forming each turbulator of the plurality of turbulators individually with a cutting tool.

9. The method of claim 7, wherein the plurality of turbulators includes one or more of stand-offs having a cylindrical shape, peaks, valleys and crosses.

10. The method of claim 8, wherein the machining comprises blowing pressurized air on at least one of the cutting tool and the turbulator being formed by the cutting tool.

11. A method of manufacturing a turbine shroud segment for a gas turbine engine defining an engine axis, the method comprising the steps of:

injecting powder injection molding material into a mold for forming a molded turbine shroud segment green part including a body extending axially between a leading edge and a trailing edge and circumferentially between a first lateral edge and a second lateral edge, the body having a radially outer surface and a radially inner surface, the mold having cavities defining negatives of features forming a textured surface on the radially outer surface of the body;

peck drilling an axial cooling flow passageway in the turbine shroud segment green part in a plurality of drilling cycles, the axial cooling flow passageway having a diameter, and the peck drilling comprises, during a drilling cycle of the plurality of drilling cycles, plunging the drilling tool through the turbine shroud segment green part to a distance corresponding to more than five times the diameter of the axial cooling flow passageway; and debinding and sintering the molded turbine shroud segment green part.

12. The method of claim 11, wherein the textured surface comprises a recessed portion on the radially outer surface.

13. The method of claim 12, wherein the textured surface comprises a plurality of turbulators protruding from the recessed portion on the radially outer surface.

14. The method of claim 13, wherein the plurality of turbulators includes stand-offs having a frustoconical shape.

15. The method of claim 13, wherein, during the injecting of the powder injection molding material into the mold, air is evacuated from within the mold via a vent defined in the mold.

16. The method of claim 15, wherein, during the injecting of the powder injection molding material into the mold, the vent is fluidly connected to the cavities of the mold defining the plurality of turbulators.

17. The method of claim 15, wherein the vent extends axially between adjacent support legs used to support the molded turbine shroud segment green part inside the mold, the adjacent support legs extending radially outward from the radially outer surface of the turbine shroud segment green part to an opposed facing surface of the mold.

18. The method of claim 17, wherein the vent further extends radially outward from inside the mold to a location external to the mold.

* * * * *